(12) United States Patent
Rothenberg

(10) Patent No.: US 8,423,368 B2
(45) Date of Patent: Apr. 16, 2013

(54) BIOFEEDBACK SYSTEM FOR CORRECTION OF NASALITY

(75) Inventor: Martin Rothenberg, Jamesville, NY (US)

(73) Assignee: Rothenberg Enterprises, Jamesville, NY (US)

( * ) Notice: Subject to any disclaimer, the term of this patent is extended or adjusted under 35 U.S.C. 154(b) by 1009 days.

(21) Appl. No.: 12/403,152

(22) Filed: Mar. 12, 2009

(65) Prior Publication Data

US 2010/0235170 A1 Sep. 16, 2010

(51) Int. Cl.
*G10L 21/00* (2006.01)
(52) U.S. Cl.
USPC ......................................................... 704/270
(58) Field of Classification Search .................. None
See application file for complete search history.

(56) References Cited

U.S. PATENT DOCUMENTS

| 3,752,929 | A | | 8/1973 | Fletcher | |
|---|---|---|---|---|---|
| 3,906,936 | A | * | 9/1975 | Habal | 600/537 |
| 4,335,276 | A | * | 6/1982 | Bull et al. | 704/276 |
| 4,519,399 | A | * | 5/1985 | Hori | 600/537 |
| 5,175,793 | A | * | 12/1992 | Sakamoto et al. | 704/200 |
| 6,384,729 | B1 | | 5/2002 | Plotkin | |
| 6,656,128 | B1 | * | 12/2003 | Linck et al. | 600/538 |
| 6,850,882 | B1 | | 2/2005 | Rothenberg | |
| 6,974,424 | B2 | | 12/2005 | Fletcher et al. | |
| 8,036,753 | B2 | * | 10/2011 | Kwon et al. | 607/57 |
| 2004/0083093 | A1 | * | 4/2004 | Lee et al. | 704/206 |

OTHER PUBLICATIONS

Australian Academy of Science, Cochlear implants—wiring for sound: How the implant works, NOVA Science in the News, Aug. 2009.*

Baken, R.J. and Orlikoff, R.F. (2000). *Clinical Measurement of Speech and Voice*, second edition, Singular Press, Thomson Learning, Chapter 11, 453-510.
Breitmeyer, B.G. (2007). "Visual masking: past accomplishments, present status, future developments," *Advances in Cognitive Psychology* 3(1-2): 9-20.
Gescheider, G.A. et al. (1996). Effects of stimulus duration on the amplitude difference limen for vibrotaction, *J. Acoust. Soc. Am.* 100, 2312-2319.
Glottal Enterprises, Speech Tutor Product Description Flyer (2003).
Reed, C.M. et al. (1982). *Research on Tactile Communication of Speech: A Review*, ASHA Monograph No. 20, American Speech and Hearing Association, Rockville MD.
Rothenberg, M. and Molitor, R.D., "Encoding voice fundamental frequency into vibrotactile frequency," *J. Acoust. Soc. Am.* 66(4), 1029-1038 (1979).
Rothenberg, M. et al. (1977). "Vibrotactile frequency for encoding a speech parameter," *J. Acoust. Soc. Am.* 62, 1003-1012.
Spreisterbach, D.C. (1965). "The effects of orofacial anomalies on the speech process," in *Proceedings of the Conference: Communicative Problems in Cleft Palate*, ASHA Monograph No. 1, American Speech and Hearing Association, Rockville MD.
Stevens, K.N. et al. (1976). "Assessment of nasalization in the speech of deaf children," *J. Speech Hearing Res.* 19, 393-416.

* cited by examiner

*Primary Examiner* — Talivaldis Ivars Smits
(74) *Attorney, Agent, or Firm* — Morrison & Foerster LLP

(57) ABSTRACT

A system is described for providing biofeedback to hearing-impaired persons as to the degree of nasalization of vowel-like sounds in their speech, in order to monitor their own nasality and thus correct inappropriate nasalization. In a preferred embodiment, this feedback uses tactile vibration, with the vibration frequency or amplitude reflecting the nasalance of the speech.

36 Claims, 1 Drawing Sheet

BIOFEEDBACK SYSTEM FOR CORRECTION OF NASALITY

BACKGROUND OF THE INVENTION

1. Field of the Invention

The invention relates to a method and device for the diagnosis and treatment of speech disorders and more particularly to a device and method for providing biofeedback on the level of nasalization of voiced speech.

2. Description of the Related Technology

A. Velar Control and Oronasal Valving in Speech

During speech or singing, it is necessary to open and close the passageway connecting the oral pharynx with the nasal pharynx, depending on the specific speech sounds to be produced. This is accomplished by lowering and raising, respectively, the soft palate, or velum. Raising the velum puts it in contact with the posterior pharyngeal wall, to close the opening to the posterior nasal airflow passageway.

This oronasal (or velopharyngeal, as it is usually referred to in medical literature) passageway must be opened when producing nasal consonants, such as /m/or /n/ in English, and is generally closed when producing consonants that require a pressure buildup in the oral cavity, such as /p/, /b/ or /s/. During vowels and vowel-like sonorant consonants (such as /l/ or /r/ in English), the oronasal passageway must be closed or almost closed for a clear sound to be produced. (Though some languages, such as French, include some vowels that are properly pronounced with nasalization, as the first vowels in the words "francais" and "manger". In addition, vowels adjoining a nasal consonant are most often produced with some degree of nasalization.)

There are many disorders that result in inappropriate oronasal valving, usually in the form of a failure to sufficiently close the oronasal passageway during non-nasal consonants or non-nasalized vowels. Such disorders include cleft palate and repairs of a cleft palate, hearing loss sufficient to make the nasality of a vowel not perceptible to the speaker, and many neurological and developmental disorders.

The effect on speech production of insufficient oronasal closure is usually separated into two effects, namely, the nasal escape of pressurized oral air, termed 'nasal emission', that limits oral pressure buildup in those speech sounds requiring an appreciable oral pressure buildup (as /p/, /b/, /s/ or /z/), and, secondly, the incomplete velar closure during vowels and sonorant consonants that is often referred to as 'nasalization' (Baken and Orlikoff, 2000). The terminology used here is that suggested by Baken and Orlikoff, who also prefer to reserve the term 'nasality' for the resulting perceived quality of the voice.

It is well-documented, and easy for even a lay person to hear, that a person who is severely hearing impaired from a time that precedes the learning of spoken language generally learns to speak with an abnormally high degree of nasality. This nasality is primarily due to the nasalization of vowel-like speech sounds. It is commonly associated with 'deaf speech' and acts to impede the comprehension of such speech (Stevens, et al., 1976; Baken and Orlikoff, supra)). Such abnormal nasalization stems from at least three factors: first, that the acoustic effects of improper velar action cannot be perceived by persons with a strong hearing impairment, second, that since the action of the velum is not easily observed visually, velar action cannot be mimicked by visual observation (as might be motions of the lips, for example), and third, that there is little proprioceptive feedback for velar action to aid in learning (Stevens, et al., supra). As a result, there is a need for convenient and reliable systems to provide an alternate means of feedback for the hearing-impaired person trying to learn or improve velar control.

It is also well documented that nasality also is important in the speech of persons with a cleft palate. In a summary article, Spreisterbach (1965) concludes, "Clearly, articulation errors and nasality are the two most frequent and significant communicative problems of speakers with cleft palates. Furthermore they are related." He also concludes that: "Velopharyngeal incompetence is undoubtedly the principle factor in accounting for the articulation errors and the nasality."

B. Previous Methods for Providing Biofeedback for the Control of Nasality

Early speech training methods for the hearing impaired are summarized by Baken and Orlikoff (supra), and range from using a fingertip on the side of the nose to detect sound passing through the nose to electronic devices that picked up such nasal vibration with a vibration sensor (microphone or accelerometer) held against the side of the nose, with visual feedback provided to the user by means of a meter, oscilloscope or computer screen (Stevens, et al., 1976). Though yielding some information, such methods work poorly for women and children, whose normal voice pitch is too high to stimulate significant vibration of the surface of the nose or to be picked up readily by the tactile sense. Thus, though a gross indication of nasalization could be obtained for a held vowel spoken loudly by an adult male speaker, methods based on vibration of the surface of the nose activating a visual display yield results highly dependent on sensor placement, facial anatomy, voice pitch and loudness and speech content. As a result, such methods are not reliable enough to be used for self-monitored real-time biofeedback by a variety of speakers during continuous speech.

The development of digital computers capable of processing speech-like signals in real time, and displaying the results of an analysis, brought more sophisticated visual displays for biofeedback. The more successful of these were displays of 'nasalance', where the term nasalance refers to a measure of the ratio of nasally emitted acoustic energy to orally emitted energy. (see, e.g., U.S. Pat. No. 3,752,929)

A visual nasalance display can be a convenient and reliable measure of nasalization for non-real-time analysis and comparison, and can provide real-time biofeedback for a held or prolonged vowel or consonant, or perhaps for unnaturally slow speech. However, during natural speech, the visual sense cannot provide real-time feedback of the time pattern of nasalance as it changes. This is due to the fact that time-sequential, spatially overlapping visual patterns tend to erase previous patterns in the visual short-term memory, in a process that is referred to as 'visual masking' (Breitmeyer, 2007). (It is for this reason that one cannot read if the letters in the message are presented time-sequentially in the same location in the visual space. Reading is made possible by spreading the letters spatially.) In addition, visual displays in general take a hearing impaired user's eyes from the task of speech reading.

Tactile stimulation has long been considered as a modality for encoding speech, usually in the form of vibration, though sometimes in the form of electrocutaneous stimulation. Methods considered have ranged from arrays of vibrators or electrical contactors, each encoding the energy in a different band of frequencies, to varying the amplitude, waveform or frequency of a stimulus at one location (Reed, et al., 1982; Rothenberg and Molitor, 1979)

An array of vibrators or contactors has proven only marginally successful for encoding speech parameters, probably because there is no natural connection between movement over the surface of the body and contrasting speech parameters (Reed, et al., supra). Thus an array approach would require a lengthy learning process to communicate information meaningfully. The use of the amplitude, waveform or frequency of vibrotactile stimulation at a single location for conveying information has been studied extensively. It is well known that the hearing-impaired can detect rhythmic patterns by putting their hands on a musical instrument or loudspeaker, and voice-related vibration can often be detected by placing the fingertips on the face or neck of the speaker. In addition, this type of stimulation is now used successfully in cell phones and pagers for alerting the user, and has been suggested as a signaling modality for at least one biofeedback application (U.S. Pat. No. 6,384,729). However the use for conveying more complex forms of speech information is more problematic (Rothenberg, et al., 1977) due to the limited information processing capacity (channel capacity in information theoretic terms) of the skin. One attempt to limit the amount of speech information transmitted to the skin to keep the information within the channel capacity of the tactile sense, by encoding only the voice pitch and reducing the pitch information to the frequency range detectable by the skin, was partially successful (Rothenberg and Molitor, 1979). However, a problematic limitation of approximately 200 ms was found in the time resolution of the tactile sense. This limitation, and other sensory limitations on the use of vibration frequency as a sensory modality, restricted the success in vibrotactile encoding of voice pitch.

As discussed above, improvement in the control of nasality in speech is quite important in a number of cases, most especially for many persons who are hearing impaired and for those with a cleft palate. However, a means for providing biofeedback sufficient for enabling a user to improve his or her velopharyngeal valving has to-date eluded researchers and other practitioners. Embodiments of the present invention address this need.

C. References Cited

The following references are representative of the background of the invention and are incorporated herein in their entireties.

U.S. Patent Documents

| | | |
|---|---|---|
| 3,752,929 | August, 1973 | Fletcher (Process and Apparatus for Determining the Degree of Nasality) |
| 6,850,882 | February, 2005 | Rothenberg (System for measuring velar function during speech) |
| 6,974,424 | December, 2005 | Fletcher (Palatometer and nasometer apparatus) |
| 6,384,729 | May, 2002 | Plotkin (Biofeedback exercise stimulation apparatus) |

OTHER REFERENCES

Baken, R. J. and Orlikoff, R. F., *Clinical Measurement of Speech and Voice*, second edition, Chapter 11, 453-510, Singular, Thomson Learning (2000).

Breitmeyer, B. G., Visual masking: past accomplishments, present status, future developments, *Advances in Cognitive Psychology* 3, 9-20 (2007).

Gescheider, G. A., Zwislocki, J. J. and Rasmussen, A., Effects of stimulus duration on the amplitude difference limen for vibrotaction, *J. Acoust. Soc. Am.* 100, 2312-2319 (1996)

Glottal Enterprises, Speech Tutor Product Description Flyer (2003).

Reed, C. M., Durlach, N. I. and Braida, L. D., *Research on Tactile Communication of Speech: A Review*, ASHA Monograph Number 20, American Speech and Hearing Association, Rockville Md. (1982)

Rothenberg, M. and Molitor, R. D., Encoding voice fundamental frequency into vibrotactile frequency, *J. Acoust. Soc. Am.* 66(4), 1029-1038 (1979).

Rothenberg, M., Verrillo, R, T., Zahorian, S. A., Brachman, M. L. and Bolanowski, S. J, Vibrotactile frequency for encoding a speech parameter, *J. Acoust. Soc. Am.* 62, 1003-1012 (1977).

Spreisterbach, D. C., The effects of orofacial anomalies on the speech process, in *Proceedings of the Conference: Communicative Problems in Cleft Palate*, ASHA Monograph Number 1, American Speech and Hearing Association, Rockville Md. (1965)

Stevens, K. N., Nickerson, R. S., Boothroyd, A. and Rollins, A. M., Assessment of nasalization in the speech of deaf children, *J. Speech Hearing Res.* 19, 393-416 (1976).

SUMMARY OF THE INVENTION

Embodiments of the present invention relate to methods and devices for the diagnosis and treatment of speech disorders including providing biofeedback on the level of nasalization of voiced speech to a person seeking to improve his or her control of voice nasality, such as, but not limited to, a person who is hearing impaired or a person recovering from surgery for a cleft palate.

It is an object of embodiments of the invention to provide a means for real-time feedback of the degree of nasalization during speech for use by hearing impaired speakers and others attempting to learn proper control of the velum in speech and the control of nasalization.

According to embodiments of the invention, the nasalization of vowel-like portions of a user's speech is measured, as by the use of a device for measuring voice nasalance, and this measurement is used to control a parameter of a tactile stimulus, as the amplitude of vibration of a vibratory device held against the skin.

The user can be readily taught to associate the magnitude of the vibratory or other tactile stimulus with the degree of nasalization, as by prerecording and presenting to the user speech stimuli having various degrees of nasalization.

According to embodiments of the invention, the amplitude of a vibratory or electrocutaneous is used to transmit to the user the approximate degree of nasalization in the vowel-like portions of his or her speech. The success of this method is predicated on a number of factors from previous knowledge: 1. The nasalization of voiced speech is a feature that is spread in time sufficiently so as not to be limited by the 200 ms limitation in the temporal acuity of the tactile sense. In fact, the temporal limitation of the tactile sense appears to aid in this application by blurring perceptually the interruptions of the vibratory signal caused by consonants interrupting the stream of voiced speech. 2. Gescheider, et al. (1996) report difference limens (differences that can be perceived) for vibrotactile amplitude that are approximately 20% of the stimulus amplitude. These differentiable increments are fine enough to encode the required number of differentiations in the level of nasalization. 3. The intensity of a vibratory stimulus can be readily associated with a nasalization-related variable and requires minimal learning for this association to be made.

These, together with other objects, advantages, features and variants which will be subsequently apparent, reside in the details of the implementation of this method as more fully hereinafter described in the claims, with reference being had

DETAILED DESCRIPTION OF THE PREFERRED EMBODIMENTS

Figure 1:
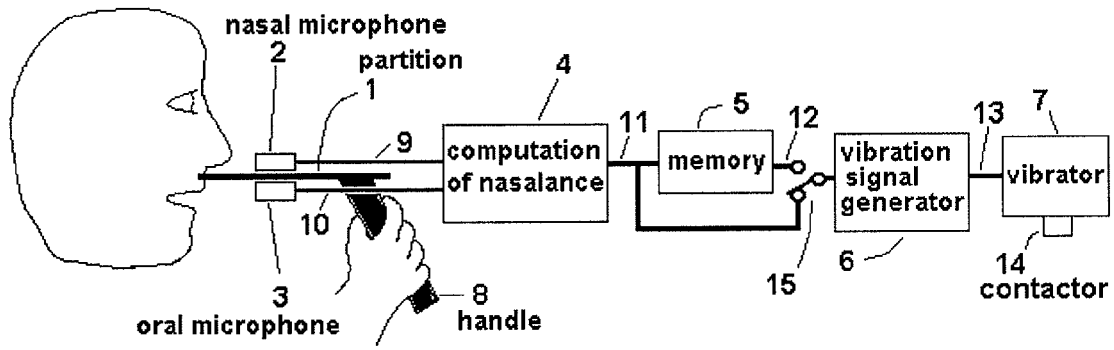
FIG. 1 depicts a system for converting vowel nasality into the amplitude or frequency of vibration.

In a preferred embodiment of the apparatus described herein, the nasality of vowels and vowel-like consonants is measured by microphones 2 and 3 in FIG. 1, which are located on and affixed to either side of an acoustic barrier or partition 1. The partition and microphones can be held in place by a handle 8, though hands-free operation can also be accomplished using straps to the head. The nasal and oral microphone outputs 9 and 10, respectively, are sent to a processor 4, which can be a program in a digital computer, that computes a measure of the nasalance of the voice 11 from the ratio of amplitudes of the signals 9 and 10. This measure 11 can be either passed directly to a vibration signal generator 6, for real-time biofeedback, or stored in a memory 5 for future playback, signal 12, as controlled by switch 15. Playback from memory could be advantageous, for example, when comparing the user's nasality pattern with that of an instructor or therapist (e.g., a target pattern or time series of speech nasalizations). The pattern of vibration is preferably a sequence of pulses, or a sinusoidal approximation, at a frequency at which the vibration is most readily discriminable by the tactile sense, such as between 20 and 60 Hz. The vibration pattern 13 is modulated, preferably in amplitude, by the nasalance signals 11 or 12, and applied to a vibrator 7, which has a moving contactor 14 that can by placed on a convenient location on the skin. Suitable vibrators, also known as skin stimulators, are commercially available from companies such as Audiological Engineering Corp. of Somerville, Mass. According to another embodiment of the invention, alternative methods and means of stimulation may be employed such as electrotactile stimulation using, for example, the Tickle Talker™, an eight-channel electrotactile device developed by the University of Melbourne.

Figure 2:
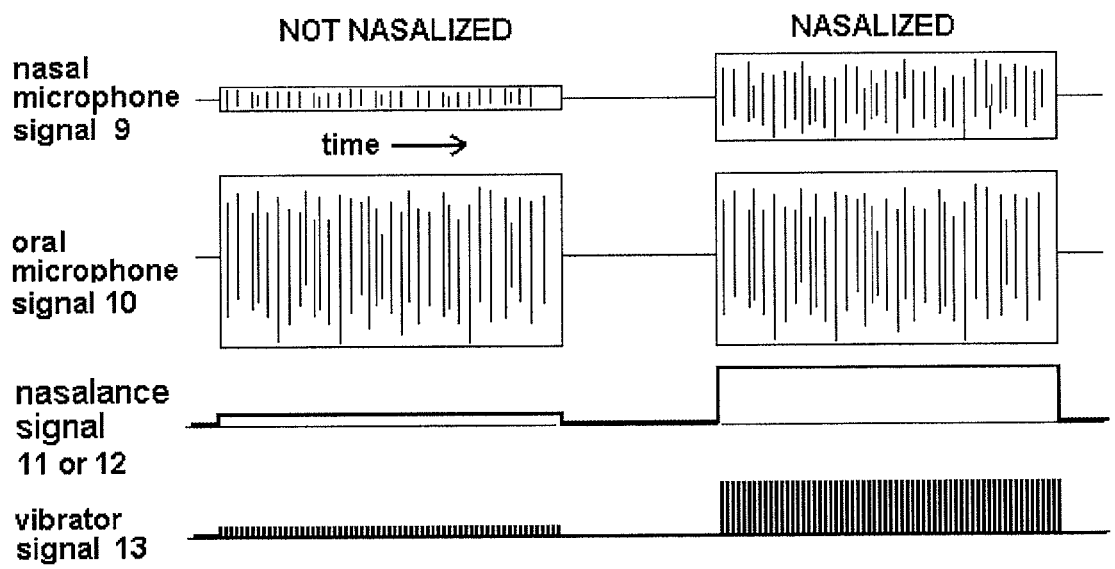
FIG. 2 shows idealized signals for a vowel that is not nasalized and one that is nasalized, as derived from the nasal and oral microphone signals.

The various signals in the preferred embodiment in FIG. 1 are shown diagrammatically in FIG. 2 for a vowel segment that is not nasalized and one that is nasalized. The amplitude of the nasalance signal is shown to differ by about a factor of 3 or 4 between the non-nasalized and nasalized cases. This reflects well the differences that can be expected from nasalance measurement systems built according to present art, and provide a difference in vibration amplitude that is clearly discernable when applied to sensitive parts of the skin, such as the hand of the inside of the forearm.

In another preferred embodiment of the system described herein, the nasal and oral microphones, 2 and 3 in FIG. 1, are mounted in the nasal and oral chambers, respectively, of a dual chamber pneumotachograph mask of the type described in U.S. Pat. No. 6,850,882 and presently marketed by Glottal Enterprises (2003). In this embodiment, the microphone signals 9 and 10 in FIG. 1 represent the acoustic volume velocity or airflow emitted by the nose and mouth respectively, instead of the acoustic pressures as in the previous embodiment. In a voice evaluation application, the mask implementation for recording nasal and oral energies offers certain advantages and drawbacks as compared to the partition implementation; however, either can be employed for training purposes.

In yet another embodiment, the nasalance computation, 4 in FIG. 1, can be performed from only a measure of nasally emitted acoustic energy, as a microphone placed to receive primarily nasal energy or an accelerometer affixed to the side of the nose, with the oral energy set as a constant adjustable by the user or a therapist. However, such implementations, though possibly more convenient in some applications, as with very young children, would be expected to be less stable in operation than the two embodiments described above, since they lack the normalization for speech effort provided by a true computation of nasalance.

In other embodiments, the memory 5 in FIG. 1 could be instead placed so as to record the signals 9 and 10, respectively. In such an embodiment, the recorded signals could also be played back through a loudspeaker.

The illustrated embodiments are shown by way of example. The spirit and scope of the invention are not restricted by the preferred embodiments shown.

What is claimed is:

1. An apparatus providing biofeedback of a degree of nasalization of vowels and vowel-like consonants comprising:
    a sensor detecting and providing an output indicating a degree of nasalization of a voice; and
    a tactile stimulator responsive to said output of said sensor to provide a tactile stimulation comprising a vibratory motion having a frequency of at least 20 hertz and no greater than 60 hertz.

2. The apparatus according to claim 1 in which the degree of nasalization is a measure of voice nasalance.

3. The apparatus according to claim 1 in which the tactile stimulator provides a vibrotactile stimulus.

4. The apparatus according to claim 3 in which the vibrotactile stimulus is the vibration amplitude of a vibratory device affixed or held at a location on the skin of the user.

5. An apparatus comprising:
    a detector measuring a degree of speech nasalization; and
    a tactile stimulator responsive to said degree of nasalization to provide tactile stimulation of a user comprising a vibratory motion having a frequency of at least 20 hertz and no greater than 60 hertz, a parameter of said tactile stimulation varying in response to said degree of nasalization.

6. The apparatus according to claim 5 wherein said detector comprises a microphone configured to detect nasally emitted acoustic energy.

7. The apparatus according to claim 6 wherein said detector further comprises a processor configured to compute a measure of nasalance to provide said degree of speech nasalization.

8. The apparatus according to claim 5 wherein said detector comprises another microphone configured to detect an orally emitted acoustic energy apart from said nasally emitted acoustic energy.

9. The apparatus according to claim 8 wherein said detector further comprises a processor configured to compute a measure of voice nasalance degree of nasalization of the speech.

10. The apparatus according to claim 5 further comprising a memory storing a sequence of speech nasalization measurements.

11. A method comprising the steps of:
    measuring a degree of speech nasalization; and
    responsive to said degree of nasalization, tactilely stimulating a user to a degree responsive to said degree of nasalization including generating a vibratory motion having a frequency of at least 20 hertz and no greater than 60 hertz.

12. The method according to claim 11 wherein said step of measuring includes detecting a nasally emitted acoustic energy.

13. The method according to claim 11 wherein said step of measuring includes separately detecting nasally and orally emitted acoustic energies.

14. The method according to claim 11 wherein said step of tactilely stimulating includes generating a vibrotactile stimulus having an amplitude indicative of said degree of speech nasalization.

15. The method according to claim 11 wherein said step of tactilely stimulating includes generating a vibrotactile stimulus having an amplitude selected from a series of amplitude values, said series comprising a plurality of said amplitude values, successive amplitude values monotonically increasing by an amount that is at least twenty percent of an immediately preceding amplitude value of said series.

16. The method according to claim 11 wherein said step of tactilely stimulating includes generating an electrotactile stimulus indicative of said degree of speech nasalization.

17. The method according to claim 11 further comprising recording a time series of measures of said degree of speech nasalization.

18. The method according to claim 11 further comprising recording a time series of measures of said degree of speech nasalization of a patient and comparing said recorded time series with a target time series of measures of speech nasalizations.

19. An apparatus providing biofeedback of a degree of nasalization of vowels and vowel-like consonants comprising:
a sensor detecting and providing an output indicating a degree of nasalization of a voice; and
a tactile stimulator responsive to said output of said sensor to provide a tactile stimulation comprising a vibratory stimulus having an amplitude selected from a series of amplitude values, said series comprising a plurality of said amplitude values, successive amplitude values monotonically increasing by an amount that is at least twenty percent of an immediately preceding amplitude value of said series.

20. The apparatus according to claim 19 in which the degree of nasalization is a measure of voice nasalance.

21. The apparatus according to claim 19 in which the tactile stimulator provides a vibrotactile stimulus.

22. The apparatus according to claim 21 in which the vibrotactile stimulus is the vibration amplitude of a vibratory device affixed or held at a location on the skin of the user.

23. An apparatus comprising:
a detector measuring a degree of speech nasalization; and
a tactile stimulator responsive to said degree of nasalization to provide tactile stimulation of a user comprising a vibratory stimulus having an amplitude selected from a series of amplitude values, said series comprising a plurality of said amplitude values, successive amplitude values monotonically increasing by an amount that is at least twenty percent of an immediately preceding amplitude value of said series, a parameter of said tactile stimulation varying in response to said degree of nasalization.

24. The apparatus according to claim 23 wherein said detector comprises a microphone configured to detect nasally emitted acoustic energy.

25. The apparatus according to claim 24 wherein said detector further comprises a processor configured to compute a measure of nasalance to provide said degree of speech nasalization.

26. The apparatus according to claim 23 wherein said detector comprises another microphone configured to detect an orally emitted acoustic energy apart from said nasally emitted acoustic energy.

27. The apparatus according to claim 26 wherein said detector further comprises a processor configured to compute a measure of voice nasalance degree of nasalization of the speech.

28. The apparatus according to claim 23 further comprising a memory storing a sequence of speech nasalization measurements.

29. A method comprising the steps of:
measuring a degree of speech nasalization; and
responsive to said degree of nasalization, tactilely stimulating a user to a degree responsive to said degree of nasalization including generating a vibratory stimulus having an amplitude selected from a series of amplitude values, said series comprising a plurality of said amplitude values, successive amplitude values monotonically increasing by an amount that is at least twenty percent of an immediately preceding amplitude value of said series.

30. The method according to claim 29 wherein said step of measuring includes detecting a nasally emitted acoustic energy.

31. The method according to claim 29 wherein said step of measuring includes separately detecting nasally and orally emitted acoustic energies.

32. The method according to claim 29 wherein said step of tactilely stimulating includes generating a vibrotactile stimulus having an amplitude indicative of said degree of speech nasalization.

33. The method according claim 29 wherein said step of tactilely stimulating includes generating a vibratory motion having a frequency of at least 20 Hertz and no greater than 60 Hertz.

34. The method according to claim 29 wherein said step of tactilely stimulating includes generating an electrotactile stimulus indicative of said degree of speech nasalization.

35. The method according to claim 29 further comprising recording a time series of measures of said degree of speech nasalization.

36. The method according to claim 29 further comprising recording a time series of measures of said degree of speech nasalization of a patient and comparing said recorded time series with a target time series of measures of speech nasalizations.

* * * * *